United States Patent
Mastroleo

(10) Patent No.: US 12,354,009 B2
(45) Date of Patent: Jul. 8, 2025

(54) APPARATUS AND METHOD FOR CREATING AND TRAINING ARTIFICIAL NEURAL NETWORKS

(71) Applicant: Camlin Technologies Limited, Lisburn (GB)

(72) Inventor: Marcello Mastroleo, Bari (IT)

(73) Assignee: CAMLIN TECHNOLOGIES LIMITED, Lisburn (GB)

( * ) Notice: Subject to any disclaimer, the term of this patent is extended or adjusted under 35 U.S.C. 154(b) by 1077 days.

(21) Appl. No.: 17/294,362

(22) PCT Filed: Nov. 14, 2019

(86) PCT No.: PCT/EP2019/081413
§ 371 (c)(1),
(2) Date: May 14, 2021

(87) PCT Pub. No.: WO2020/099606
PCT Pub. Date: May 22, 2020

(65) Prior Publication Data
US 2021/0279590 A1 Sep. 9, 2021

(30) Foreign Application Priority Data
Nov. 15, 2018 (GB) ..................... 1818643

(51) Int. Cl.
| | | |
|---|---|---|
| G06N 3/08 | (2023.01) | |
| G06F 18/21 | (2023.01) | |
| G06N 3/063 | (2023.01) | |
| G06N 3/082 | (2023.01) | |

(52) U.S. Cl.
CPC ........... G06N 3/082 (2013.01); G06F 18/217 (2023.01); G06N 3/063 (2013.01)

(58) Field of Classification Search
CPC ........ G06N 3/082; G06N 3/063; G06N 3/045; G06N 3/084; G06N 3/04; G06F 18/217
See application file for complete search history.

(56) References Cited

U.S. PATENT DOCUMENTS

| | | | |
|---|---|---|---|
| 2018/0032846 A1* | 2/2018 | Yang | .................... G06V 10/811 |
| 2018/0096248 A1 | 4/2018 | Chabanne et al. | |
| 2018/0268284 A1* | 9/2018 | Ren | .......................... G06N 3/04 |

(Continued)

OTHER PUBLICATIONS

Ren et al., "Based on Improved BP Neural Network to Forecast Demand for Spare Parts" (Year: 2009).*

(Continued)

Primary Examiner — Alan Chen
(74) Attorney, Agent, or Firm — Grumbles Law PLLC; Brittany Haanan

(57) ABSTRACT

An apparatus for creating and training an artificial neural network (NN) performs iterations in which it implements and tests a version of a NN model, analyses the performance of the current NN model, generates a new NN module for improving the performance of the current NN model, adds the new NN module to the structure of the existing NN model to create a new NN model for executing, testing and analysing in the next iteration. In this way, the apparatus combines the creation and the testing of the NN model thereby improving the overall efficiency and the effectiveness of the development of NN based AI systems.

16 Claims, 4 Drawing Sheets

(56) References Cited

U.S. PATENT DOCUMENTS

2018/0285727 A1* 10/2018 Baum .................. G06F 5/01
2020/0143171 A1* 5/2020 Lee .................. G06V 20/49

OTHER PUBLICATIONS

Price et al., "Speaker Adap Tation of Deep Neural Networks Using a Hierarchy of Output Layers" (Year: 2014).*
Kirsch et al., Modular Networks: Learning to Decompose Neural Computation, arXiv: 1811.05249v1 [cs.LG], Nov. 13, 2018; Total pp. 13 (Year: 2018).*
Rusu et al., Progressive Neural Networks, arXiv: 1606.04671v4 [cs.LG], Oct. 22, 2022; Total pp. 14 (Year: 2022).*
International Search Report and Written Opinion for International Application No. PCT/EP2019/081413, date of mailing: Mar. 18, 2020; date of filing: Nov. 14, 2019; 10 pp.
UK Intellectual Property Office Search Report for GB Application No. 1818643.7, date of mailing: May 10, 2019; date of filing: Nov. 15, 2018; 1 pp.
S Fahlman, C Lebiere, "The Cascade-Correlation Learning Architecture", published 1990, available from: http://papers.nips.cc/paper/207-the-cascade-correlation-learning-architecture.pdf, accessed May 7, 2019.

* cited by examiner

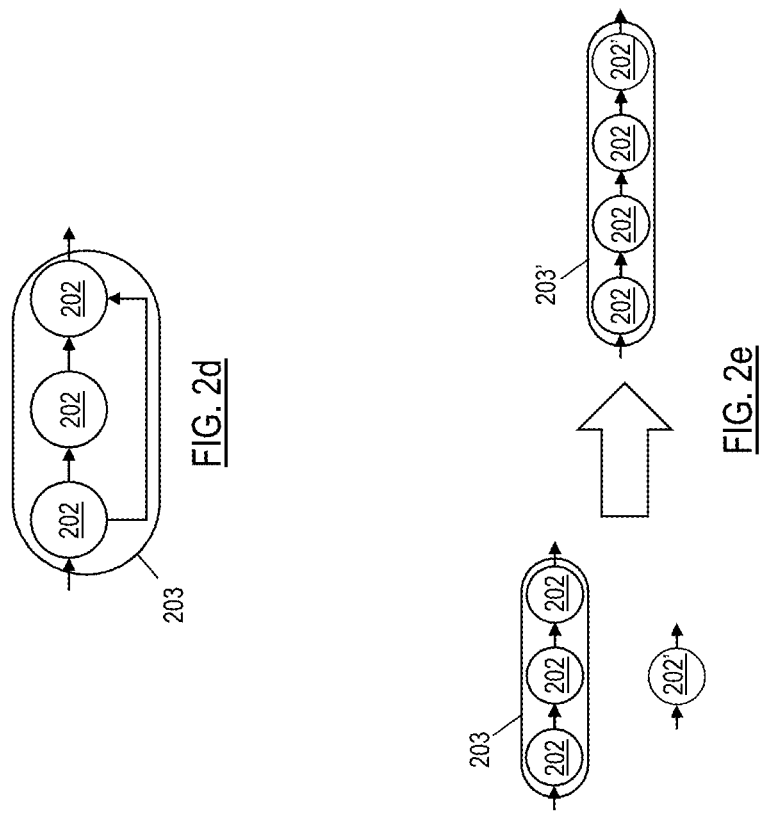
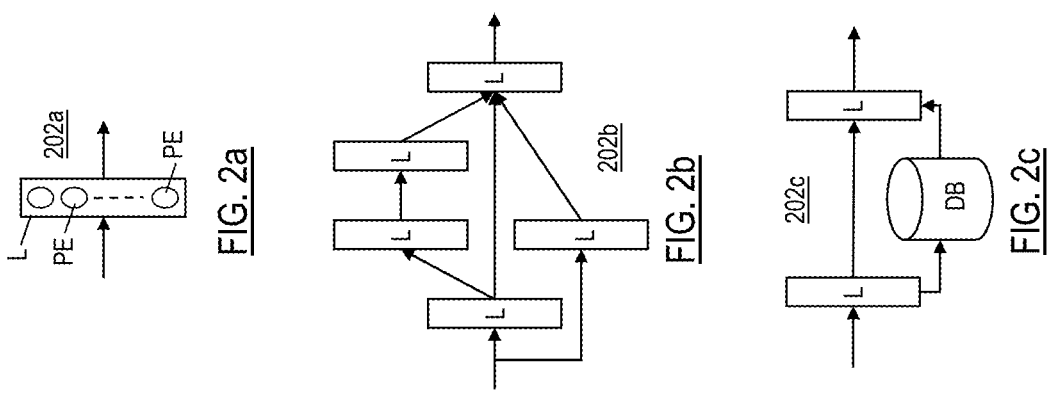

APPARATUS AND METHOD FOR CREATING AND TRAINING ARTIFICIAL NEURAL NETWORKS

FIELD OF THE INVENTION

The present invention relates to artificial intelligence systems and in particular to creating and training artificial neural networks.

BACKGROUND TO THE INVENTION

Currently, deep neural networks (DNNs) are the models used in most artificial intelligence (AI) systems. They are used at all levels from embedded devices to the cloud and improving their efficiency both in terms of training costs and running costs is a technical challenge.

The lifecycle of an artificial intelligence system employing a neural network (NN) model may be said to comprise three main phases: model selection, model training, and model deployment.

Model selection concerns the identification of the NN model structure that is the most likely to be able to solve the problem of interest. Identifying the most promising NN structure is a search problem within a meta-parameter search space, the meta-parameters typically including the number of layers of the DNN, the number of neurons for each layer, the kind of layers which should be present in the network, their connection structure, and so on. Model selection a very demanding phase both in terms of computational resources and time needed. This is because identifying the most promising structure involves multiple partial trainings of each of the different structures to be tested in accordance with a suitable cross-validation statistic scheme, for example the k-fold validation scheme.

Model training concerns the complete training of the most promising NN model that has been selected in the previous phase. The trained NN model resulting from the training phase is the one that is deployed in the final AI system.

Model deployment concerns the rest of the life of the trained NN model. The deployment typically comprises several optimizations that the NN model can be subjected to depending, for example, on whether the final AI system is implemented in a battery powered embedded device, or in a cluster of computers, and so on. Typical examples of optimizations that the trained NN model can be subjected to include increasing the sparseness of its connections, the approximation of its parameters with a low-resolution arithmetic, and so on. However, run-time optimization techniques come at the price of reducing the model accuracy that has been gained in the previous phase. After the trained NN model has been optimized to target a specific running environment, the running costs of the AI system are principally driven by the amount of resources, such as battery or other power consumption, that are needed for each instance of the NN prediction, and by the number of instances that each end device can sustain.

There have been previous attempts to make the NN lifecycle more efficient, in particular so that fewer computational resources and less energy and time are required. Most attempts aim to:

1. Reduce the number of models that are needed to be trained during the model selection phase;
2. Make computation more energy efficient;
3. Reduce the time for each NN update.

However, previous advances have never improved the lifecycle to the extent that the need to compromise between training time, computational resources, final accuracy, and budget can be avoided or significantly reduced.

It would be desirable therefore to provide improvements to the NN lifecycle that overcomes or mitigates at least some of the problems outlined above.

SUMMARY OF THE INVENTION

A first aspect of the invention provides a method of creating and training an artificial neural network (NN), the method comprising:
storing a neural network (NN) model;
implementing said neural network (NN) model;
causing input data to be processed by said NN mode to produce output data;
evaluating said output data against corresponding target output data;
creating an NN module based on said evaluating; and
adding said NN module to the stored NN model to create an updated NN model.

Preferably said adding involves adding the created NN module to an end, preferably the output end, of said stored NN model.

Typically, said NN model comprises at least one NN module, the, or each, NN module comprising at least one NN layer. Said at least one NN layer may comprise at least one NN processing element (PE). Said at least one NN layer may comprise a functional entity, e.g. a hash memory, a database query, or a query to a system or service.

In preferred embodiments, said NN model comprises a plurality of NN modules connected in series from a first NN module to a last NN module, wherein said adding involves adding said created NN module to said NN model as said last NN module.

Typically, the method includes performing at least one iteration comprising:
causing said updated model to be implemented, causing input data to be processed by said updated NN model to produce output data; evaluating said output data against corresponding target output data; creating another NN module based on said evaluation; adding said another NN module to said updated NN model to create a further updated NN model. Preferably, said at least one iteration is performed until said evaluating indicates that said output data meets at least one performance criterion.

Preferably, said evaluating involves determining whether or not said output data meets at least one criterion with respect to said target data. Said at least one criterion typically comprises a measure of closeness between said output data and said target data.

In preferred embodiments, said creating said NN module involves determining at least one data processing function that, when applied to said output data, improves the output data, and creating said NN module to implement said at least one determined data processing function. Preferably, the method includes determining that said at least one data processing function improves said NNID output data by determining that said at least one data processing function, when applied to said output data, causes the processed output data to be closer to the corresponding target output data than the non-processed output data.

In preferred embodiments, said creating said NN module involves determining an NN structure for the NN module. Determining said NN structure preferably involves determining any one or more of: a required number of NN layers of the NN structure; a composition of the or each NN layer;

and interconnections of the NN layers. Determining said NN structure may involve determining one or more values for one or more parameters of said NN structure, wherein said parameters may include at least one weight and/or at least one bias, wherein the or each weight may be a weight applied to a respective input of a respective processing element (PE) of said NN structure, and wherein said bias may be a respective input of a respective processing element (PE) of said NN structure.

Optionally, the method includes adding at least one data storage module into the NN model between any two adjacent NN modules, said data storage module comprising a memory for storing data received by the data storage module. The data storage module may include a data path between its input and output to allow data to flow from the input to the output without being stored in the memory.

The memory may be provided in a data path between the input and the output of the data storage module. Optionally an encoder is provided to encode data received at the input of the data storage module, and a corresponding decoder is provided at the output of the data storage module.

In typical embodiments, said implementing involves implementing said neural network (NN) model on an inference platform or any other means for implementing and executing NN models.

A second aspect of the invention provides an apparatus for creating and training an artificial neural network (NN), the apparatus comprising:
  means for implementing and executing NN models;
  at least one memory for storing a neural network (NN) model;
  a programmer for implementing said neural network (NN) model on said implementing means;
  means for causing input data to be processed by said NN model on said implementing means to produce output data;
  means for evaluating said output data against corresponding target output data;
  means for creating an NN module based on said evaluating; and
  means for adding said NN module to the stored NN model to create an updated NN model.

The apparatus may include any suitable means for performing any one or more features of the method of the first aspect of the invention.

Preferred embodiments of the invention increase the overall efficiency and the effectiveness of all the three major phases in the development of NN based AI systems. In particular, preferred embodiments allow the model selection phase and the model training phase to be performed together whereby the NN model is dynamically designed while it is trained. Moreover, preferred embodiments allow, during the "design while training" phase, optimization requirements to be considered which lead to increased running time efficiency of the NN model without compromising its accuracy.

Preferred embodiments of the invention may be implemented by any device, platform or system that supports implementation and execution of neural networks, especially by inference, including but not limited to standard computers (e.g. PCs), single-board computers, AI specialized chips, high-performance hardware (for example clusters of GPUs, TPUs, FPGAs, and so on).

Preferred embodiments of the invention provide a time and energy efficient method and means for the training of neural networks.

BRIEF DESCRIPTION OF THE DRAWINGS

An embodiment of the invention is now described by way of example and with reference to the accompanying drawings in which:
FIG. 2a is a block diagram of a first example of an NN layer;
FIG. 2b is a block diagram of a second example of an NN layer;
FIG. 2c is a block diagram of a third example of an NN layer;
FIG. 2d is a schematic diagram of an example of a NN model;
FIG. 2e is a schematic diagram illustrating a model growing process.

DETAILED DESCRIPTION OF THE DRAWINGS

Figure 1:
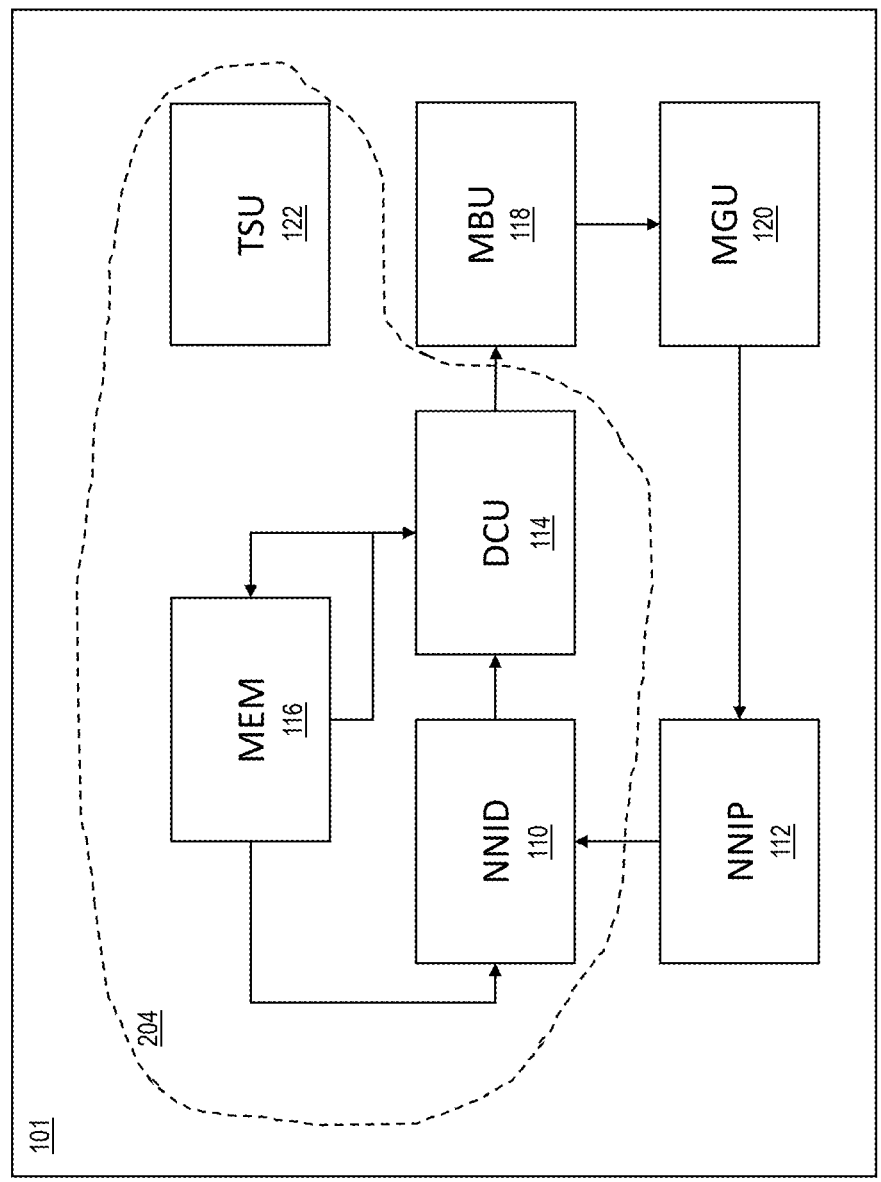
FIG. 1 is a block diagram of an NN model creating and training apparatus embodying one aspect of the invention.

Referring now to FIG. 1 of the drawings, there is shown, generally indicated as 101, a block diagram of a preferred artificial NN model creating and training apparatus embodying one aspect of the invention.

As is described in more detail hereinafter, the artificial NN model being created and trained by the apparatus 101 comprises a plurality of NN modules 202 (FIGS. 2 and 2a to 2e). Each module 202 performs data processing in accordance with a respective data processing function, and typically comprises a single NN layer, or a plurality of NN layers, and the or each layer may comprise one or more NN processing element (PE). The modules 202 are connected together, preferably in series, to produce an NN model 203.

In preferred embodiments, the apparatus 101 includes:
  an artificial neural network inference device (NNID) 110 for implementing neural networks;
  an artificial neural network inference programmer (NNIP) 112 for programming the NNID 110;
  a data collector unit (DCU) 114 for collecting, storing and forwarding data; a memory (MEM) 116 for storing data;
  a module building unit (MBU) 118 for generating NN modules;
  a model growing unit (MGU) 120 for adding generated NN modules to an existing NN structure; and
  a training scheduler unit (TSU) 122 for supervising NN creation and training.

The NNID 110 may comprise any means for implementing and executing an artificial neural network. Typically, this involves performing inference with respect to a NN model and, as such, the NNID 110 may comprise any suitable inference platform or other inference means. More generally therefore, the NNID 110 may comprise any platform, system or device that is capable of implementing and executing an artificial neural network, typically by inference. Suitable implementation means include but are not limited to standard personal computers, single board computers, FPGAs, AI chips, graphics processing units (GPUs), tensor processing units (TPUs), computer clusters and more generally any device, system, platform or other means capable of performing linear algebraic primitives.

The NNIP 112 generates NN programming code and programs the NNID 110 with the code so that the NNID 110 executes the corresponding NN. The NNIP may comprise any conventional device (typically comprising hardware and software) that is capable of generating NN programming code and programming an NNID, e.g. a chip compiler or chip programmer. The NNIP 112 may for example be implemented by the same computer or processor that implements the NNID 110.

The DCU 114 is a device that collects, for each of a plurality of data records, data indicating the corresponding desired, or target, model output, data indicating the actual model output and/or data derived from the actual model output and/or previous model outputs. In particular, the DCU 114 may store either or both of: the actual output produced by running the inference of a neural network NN on the NNID 110, preferably together with the corresponding desired model output; data, e.g. statistics, calculated using one or more other NNID 110 actual model outputs and/or the corresponding desired model output(s) stored in respect of previous operation of the NNID 110, particularly with respect to one or more previous version of the NN, and preferably with respect to the same data record.

The DCU 114 may take any suitable form, for example being implemented in software and/or hardware as is convenient, and may be directly connected to the NNID 110, or may be realized, where the NNID 110 permits, as a termination layer of the NN with which the NNID 110 is programmed.

The memory 116 may take any conventional form that is suitable for storing data. The memory 116 stores data records 201 (see FIG. 2, which shows part 204 of the apparatus 101 of FIG. 1), each record 201 comprising data indicating a model input (In) and a corresponding desired model output (Out). The model input may comprise, but it is not limited to, any kind of data acquired by one or more sensors, and may indicate the raw sensor output value, or the result of any processing performed on the raw sensor output. Any data collected or calculated by the DCU 114 may also be stored in the memory 116. In additional, any relevant auxiliary data may be stored in the memory 116. Such auxiliary data may be, for example, received by the apparatus 101 (typically by the DCU 114) from an external source, or may be included in the data record 201. Optionally, the memory 116 comprises an encoder to compress data records 201 and a decoder to decompress data records 201.

Optionally, the DCU 114 may include a data compression/decompression unit for reducing storage requirements. Any conventional data compressor/decompressor may be used, and may be implemented in software or hardware as is convenient.

As is described in more detail hereinafter, the artificial NN model being created and trained by the apparatus 101 comprises a plurality of NN modules 202 (FIGS. 2 and 2a to 2e). Each module 202 may comprise a single NN layer, or a plurality of NN layers, and the or each layer may comprise one or more NN processing element (PE). The modules 202 are connected together, preferably in series, to produce an NN model 203.

The MBU 118 is a device that receives data, conveniently from the DCU 114, which data may include any part or all of the data collected by the DCU 114, including data collected in respect of one or more data records, as required. The MBU 118 creates a new neural network module 202' (FIG. 2e) using the data received from the DCU 114. The new module 202' is created such that, when its operation is evaluated on the actual output of the NN being implemented by the NNID 110, it produces an actual output that is closer to the desired output than the output of the NNID 110 produced by the currently implemented NN. In preferred embodiments, the MBU 118 creates a new module 202' based on data received from the DCU 114 in respect of a plurality of data records 201, e.g. a portion of, or all of, the available set of data records 201. The relative closeness of the respective outputs to the desired output may be calculated in any desired manner, e.g. using any conventional mathematical or statistical method of measuring closeness, usually with respect to one or more closeness threshold.

The MBU 118 may be configured to produce a module 202' based on one or more additional constraints other than reducing the gap between the desired output and actual one. Such constraints may for example relate to one or more NN parameters, e.g. any one or more of execution time of the module, the sparsity of the NN components, bit resolution, number of neurons, degree of compression, number of multiplications, and so on.

The new module 202' generated by the MBU 118 may take any suitable configuration, for example comprising a single NN layer, or a plurality of NN layers, the or each layer comprising one or more NN processing element (PE), as is described in more detail hereinafter. The MBU 118 may construct the module 202' in any convenient manner. Usually constructing the module 202' involves analysing the output produced by the NNID 110 with reference to the relevant desired output (typically over all of, or at least some of, the available data records 201) and identifying one or more data processing function(s) that, when applied to NNID 110 output data, improve the data (typically by making it closer to the desired output data), and then devising a module 202' (i.e. its required NN model structure and parameters) that implements the identified function(s). Typically, devising the NN model structure for the module 202' involves determining the number of layers L, the composition of the, or each, layer L, and the interconnection of the layer(s), as applicable. Typically, the parameters comprise the weight(s) and bias(es) of the layer(s), and in particular of the, or each, PE.

By way of example, in cases where the NN model 203 is desired to solve a classification problem, in general it is required that the output of the last layer of the trained NN model has one PE for each of the classes, and that a property P is exhibited whereby the output of the respective PE that is responsible for detecting the $i^{th}$ class has an output value that is higher than the output values of the other PEs when an input belonging to the i-th class has been processed. Assuming that the layer parameters are W (the weights) and B (the biases), and that O is the output of the previous layer, then it is required that the function (W×O+B) computed by the layer should possess the property P.

A conventional way to obtain the property P is to cause the function (W×O+B) to be "close" to the One-Hot encoding of the target class, where One-Hot encoding is a known class encoding scheme that produces vectors of length equal to the total number of classes which are all zero but only one entry set to 1 corresponding to the encoded class number, e.g. if there are 20 classes then the One-Hot encoding of the $i^{th}$ class is a 20-dimensional vector of all zeros except its $i^{th}$ entry.

Optionally, an approximate version of the conventional way may be taken that solves the problem "on average", meaning that it sends the previous module output average of each class to the One-Hot Encoding of the corresponding classes (which in this particular case equals the Identity Matrix, i.e. all zeros except the diagonal elements being set to 1).

For example, in the case where the apparatus 101 is configured to grow a NN model for classifying input data in accordance to a predetermined finite set of categories, the DCU 114 may collect statistics comprising the average actual NN outputs, $O_a$, with respect to a set of the categories and the MBU 118 may produce a new module 202 having parameters W and B obtained by solving the equation $W \times O_a + B = I_c$, where $I_c$ is the identity matrix over the desired set of categories.

Another approach is for the MBU 118 to produce and new module 202' having parameters W and B obtained as the least square solution W, B of the problem:

$$W \times NN(\text{In}) + B = \text{OneHot(Out)}$$

Where NN(In) are the data collected by the DCU 114 as result of the NNID 110 evaluating the current NN model 203 over all the data records 201, and the corresponding OneHot (Out) data may be calculated inside the DCU 114 itself.

The MBU 118 may take any suitable form, for example being implemented in software and/or hardware as is convenient.

The MGU 120 is a device that can store the structure of an artificial NN model and its parameters. This may include, as applicable, the number of NN layers, the number of NN PEs in each layer, the interconnection(s) between layers and/or PEs, the number of input(s) of each PE, and the weighting and/or bias of the input(s). In preferred embodiments, the MGU 120 may store the NN model structure on a "per module 202" basis, as well as storing the interconnection between modules 202. The MGU 120 can grow the NN model 203 by adding and connecting new modules 202 to the existing NN model 203. In particular, the MGU 120 adds the, or each, new module 202' generated by the MBU 118 to the existing NN model 203 stored by the MGU 120 (which corresponds to the NN model 203 currently being implemented by the NNID 110). As is illustrated in FIG. 2e, in preferred embodiments, the MGU 120 adds the new module 202' to the end, i.e. as a new last module 202', of the existing NN model 203 to create a new NN model 203'. In this way, the MGU 120 builds the NN model 203 as a plurality of modules 202 connected in series. Moreover, the model 203 is preferably built over a plurality of iterations of operation of the apparatus 101, wherein in each iteration a new module 202' is added to the end of the existing model 203. The MGU 120 may include any suitable memory for storing models and related data. Typically, the model growing unit MGU 120 stores in its memory the current NN model 203, and when it receives a new module 202', produced by the MBU 118, it connects the new module 202' to the memorized NN model 203 to produce a new NN model 203', which it stores. The new model 203' becomes the current model 203 for the next iteration.

As is described in more detail below, the MGU 120 can optionally add a termination unit T to the DCU 114, or between the NNID 110 and the DCU 114 to support the collector operations, otherwise it may instruct the DCU 114 on the kind of data that it has to collect. The MGU 120 may instruct the DCU 114 to keep some of the data it stores and/or calculates for use in further optimizations.

In preferred embodiments, the NN model 203 comprises a plurality of modules 202, all of the modules 202 being connected in series from a first module 202 to a last module 202 whereby adjacent modules 202 in the series are connected to the, or each, adjacent module 202 in the series such that there is a linear flow of data from the first module to the last module via any intermediate module(s). Optionally, two or more of the modules 202 may be interconnected in a manner other than a direct series interconnection between adjacent modules 202. This is illustrated by way of example in FIG. 2d, which shows the first module 202 being connected to the last module 202 which is not adjacent to it. It is however preferred that the linear series interconnection of modules is present in addition to any non-linear series connection(s) that may be required.

The MGU 120 may be configured to add one or more required non-linear connections between the modules 202 in the model 203, i.e. any required connection(s) other than the direct connection between the last module of the existing model 203 and the new module 202' to make it the last module 202' of the new model 203'. Any such required non-linear connections may be determined by the MBU 118 and corresponding data indicating same may be provided to the MGU 120.

Optionally, the MGU 120 may be configured to add one or more other modules 202 to the model 203, i.e. other than the new module 202' provided by the MBU 118. For example, the TSU 122 may instruct the MGU 120 to insert one or more data storage module 330 (described in more detail hereinafter) into the model 203.

The MGU 120 provides data to the NNIP 112 defining the new model 203' that it has created. The NNIP 112 produces an executable version of the new model 203' (e.g. using a suitable compiler) and programs the NNID 110 with the new model 203'.

Accordingly, the apparatus 101 performs at least one iteration, but typically a plurality of iterations, whereby in each iteration it implements and tests (using the data records 201) a respective version of the NN model 203, analyses the performance of the current NN model 203, generates a new module 202' for improving the performance of the current NN model 203, adds the new module 202' to the structure of the existing model 203 to create a new NN model 203' for executing, testing and analysing in the next iteration. In this way, the apparatus 101 combines the creation and the testing of the NN model 203. The iteration process may terminate when any desired end criterion/criteria are met, e.g. that the output of the NN model currently being executed in the NNID 110 is satisfactorily close to the desired output (e.g. as may be determined using any conventional mathematical or statistical method of measuring closeness, usually with respect to one or more closeness threshold), and/or when one or more constraints (examples of which are provided hereinafter) are met.

Typically, all of the data records 201 are passed through the current NN model 203 in the NNID 110 and the resulting data, and any derivative data as applicable, is used to by the MBU 120 to produce the new module 202'. However, the module 202' may alternatively be produced using a subset of the data records 201.

The TSU 122 is an NN training supervision device that may be implemented in hardware or software as is convenient. The TSU 122 supervises the NN growing process and facilitates synchronization and communication between the other components 110, 112, 114, 116, 118, 120 as required.

Reference is now made in particular to FIGS. 2 and 2a to 2e. The memory 116 stores a plurality of data records 201 for use in testing the NN model 203 being constructed. Each data record includes input data (In) which is used as input for the NN model 203 being implemented by the NNID 110. Each record 201 also includes corresponding desired output data (Out), which is the desired output that the NN model 203 would produce for the corresponding input data (In) if it were ideally suited to the task for which the NN model 203 is being developed.

Each module 202 is a functional entity that transforms an input (i.e. input data) into an output (i.e. output data) in accordance with the function that it is configured to implement.

In typical embodiments, each module 202 comprises at least one layer L, each layer L comprising any functional entity where the functional entity may be:
1. A conventional trainable NN layer, e.g. a dense layer, a convolutional layer, a batch normalization layer, a deconvolution layer, an attention layer, and so on;
2. A conventional non-trainable NN layer, e.g. an activation layer, a concatenation layer, a pooling layer, and so on; or
3. Any other trainable or non-trainable functional entity, e.g. a hash memory, a database query, a query to a system or service, and so on.

Each layer L of the module 202 may be interconnected with each other in any configuration to form a network that performs the required data processing function for the respective module 202. For example, the layers L of a module 202 may be interconnected or otherwise arranged to provide any conventional network of NN layers aimed to achieve a specific functionality, e.g. an arrangement of convolutional layers L to achieve multi-resolution analysis, or a residual composition of layers L, and so on; and/or a network comprising one or more functional entities (e.g. as outlined at point 3 above) that a conventional NN layer cannot include due to conventional backpropagation NN training methods.

By way of example, FIG. 2a illustrates a module 202a comprising a single NN layer L, FIG. 2b illustrates a module 202b comprising five, typically different, NN layers L organized over three interconnected branches, and FIG. 2c illustrates a module 202c comprising two NN layers L which are connected both directly to each other, and indirectly through a database DB, which when queried with the output of the preceding layer L returns data used as input at the following layer L.

Each layer L may comprise one or more NN processing element (PE), which may also be referred to as a node or an artificial neuron. The, or each, PE is typically connected between the input and the output of the respective layer L. The PEs of any given layer L may be interconnected to form a network between the input and output of the layer L. Each PE is a functional entity that transforms its input(s) into an output in accordance with the function that it is configured to implement. Each layer L is a functional entity that transforms its input(s) into an output(s) in accordance with the function that it is configured to implement, as determined by its PEs.

The PEs may take any conventional form, and may be interconnected in any conventional manner to form the NN model 203. Typically, each PE has at least one but usually a plurality of weighted inputs, and optionally a bias input, and produces an output that corresponds to a function of the weighted sum of the weighted inputs, biased by the value of the bias input, when present. Depending on the configuration of the NN model 203 (and more particularly on the configuration of the respective module 202 and of the interconnection of modules 202), the weighted input(s) of one or more of the PE(s) in any one layer L are connected to the output of one or more PE of a preceding layer L, or to an external input or a bias input. In typical embodiments, the PEs are implemented electrically or electronically, e.g. in analogue and/or digital electrical/electronic form. Alternatively, they may be implemented in software. In conventional NN models, the weighting of the weighted inputs may be updated during training by various algorithms, e.g. the backpropagation algorithm.

As indicated above, the DCU 114 may handle, i.e. store and forward as applicable, the actual output produced by the NNID 110. Alternatively, or in addition, the DCU 114 may process the output received from the NNID 110 to generate derivative data, e.g. statistical data, therefrom, and may store and/or forward the derivative data as required. To facilitate such processing of the NNID 110 output, the DCU 114 may include a termination unit (T), which may conveniently be implemented as a termination layer connected to the end of the NN model 203 being implemented by the NNID 110.

Figure 2:
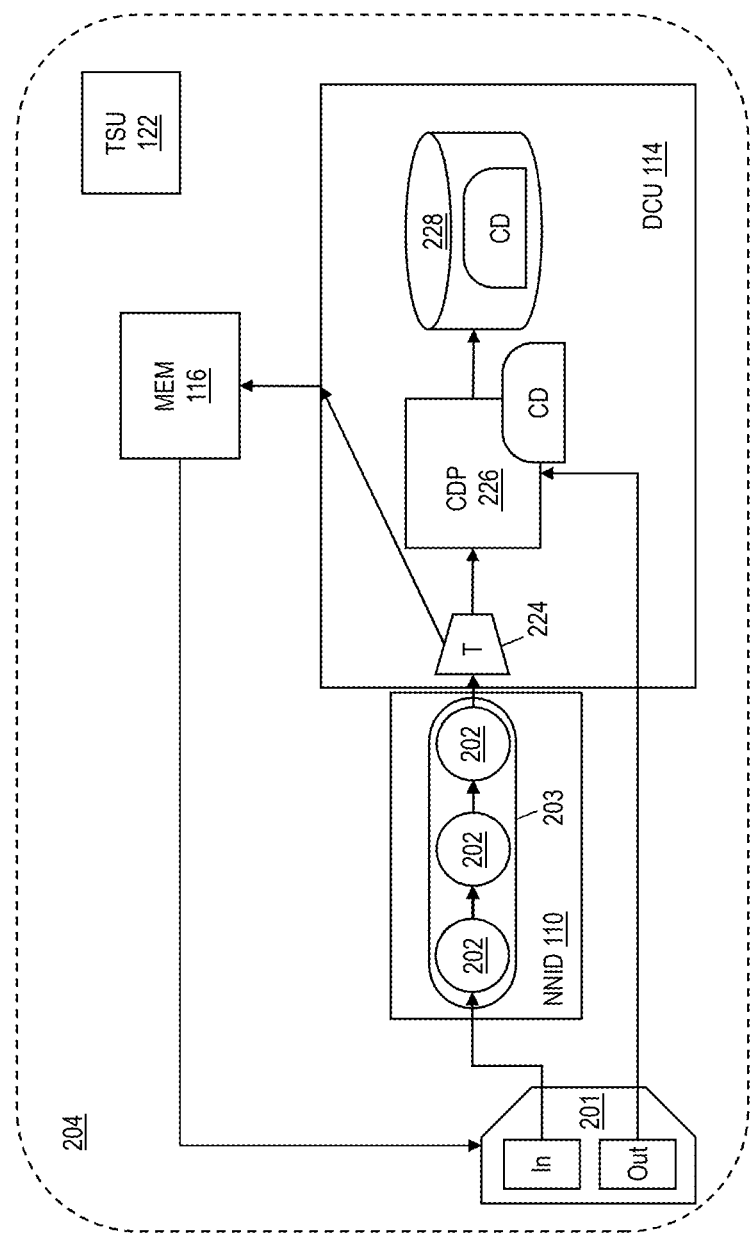
FIG. 2 is a block diagram of providing a more detailed view of part of the apparatus of FIG. 1.

Referring now in particular to FIG. 2, the preferred DCU 114 produces collected data CD in respect of the data records 201 as follows. In this example it is assumed that the DCU 114 has the termination unit 224. The input data (In) of one or more data records 201 is provided to the NN model 203 which is currently evaluated by the NNID 110. The resulting output of the NNID 110 is forwarded to the termination unit T. The termination unit T is configured to forward the received NNID output, and/or data derived therefrom, to the memory 116 and/or to a collected data producer (CDP) 226. In this regard, the termination unit T may be configured to perform data processing on the received NNID output to produce derived data. The data processing performed by the termination unit T may take any form depending on the application, but typically comprises any desired statistical calculation, for example calculation of any one or more of mean values, standard deviations, correlations, relative entropy, and so on. In alternative embodiments, the termination unit T may be omitted, in which case the output received from the NNID 110 may be sent directly to the memory and/or CDP 226 as required.

The CDP 226 is configured to perform a data consolidation process which involves consolidating the output of the termination unit T (or otherwise the output of the NNID 10 when the termination unit T is not present) with the corresponding output data (Out) of the respective data record 201. The CDP may also preform any required data processing of the output received from the termination unit T (or NNID 110 as applicable) together with the respective output data (Out) of the data record 201. This data processing performed by the CDP 226 may take any form depending on the application, but typically comprises any desired statistical calculation, for example calculation of any one or more of closeness, mean values, standard deviations, correlations, relative entropy, and so on. The data received and generated by the CDP 226 may provide a respective collected data CD record for each data record 201, or may update a single data record CD as each data record 201 is processed, as is convenient. The collected data CD is used by the MBU 118 when creating a new module 202'. The DCU 114 may include a memory 228 for storing the collected data CD.

Depending on the capabilities of the NNID 110, some or all of the functionality of the DCU 114 may be performed by the NNID 110, as is convenient.

The MBU 118 is configured to produce a new NN module 202' using some or all of the collected data CD. In particular, the new module 202' is generated such that a new, or updated, NN model 203' comprising the existing NN model 203 (i.e. the model 203 currently implemented by the NNID 210) and the new module 202' performs better than the existing model 203. This is achieved by assessing the output of the NNID 110 against one or more performance metric, typically comprising a performance metric that indicates the closeness between the output generated by the existing NN model 203 evaluated on the input data (In) and the corresponding output data (Out) of the respective data record 201. Alternatively or in addition the performance metric may involve assessment of the parameters of the new module 202', especially an assessment of how many of the parameters are not zero or null. Optionally, the MBU 118 can be configured to use only part of the collected data CD to avoid the production of over-fitted modules 202.

The Training Scheduling Unit TSU 122, when present, is responsible for supervising the model creation and training process by allowing all the other components of the apparatus 110 to cooperate in the production of the trained model 203. In particular the TSU 122 may be configured with one or more model constraints, which are preferably optimized during the training process. Such constraints may comprise any one or more of:
1. Global constraints:
   a. The minimum and/or maximum number of modules 202 in the model 203
   b. The kind of modules 202 which can be produced during the training procedure
   c. The resolution and the arithmetic type for the model's parameters
   d. A precise composition of modules 202 making up the model 203
2. Module constraints:
   a. The minimum and/or maximum number of nodes (PEs) for dense layers L
   b. The minimum and/or maximum number of filters for convolutional layers L
   c. The sparsity index for a module's connections In preferred embodiment, the TSU 122 is responsible for ensuring that the precedencies between modules 202 and within modules 202 are respected during the training, for example:
   When a module 202 follows a another one in a precise model composition the TSU 122 ensures that the former is trained only after the latter has been trained
   When a module 202 to be trained comprises multiple layers L, the TSU 122 ensures that the order of the module's layers L to be trained is compatible with the topological sort of the module connection.

Figure 3B:
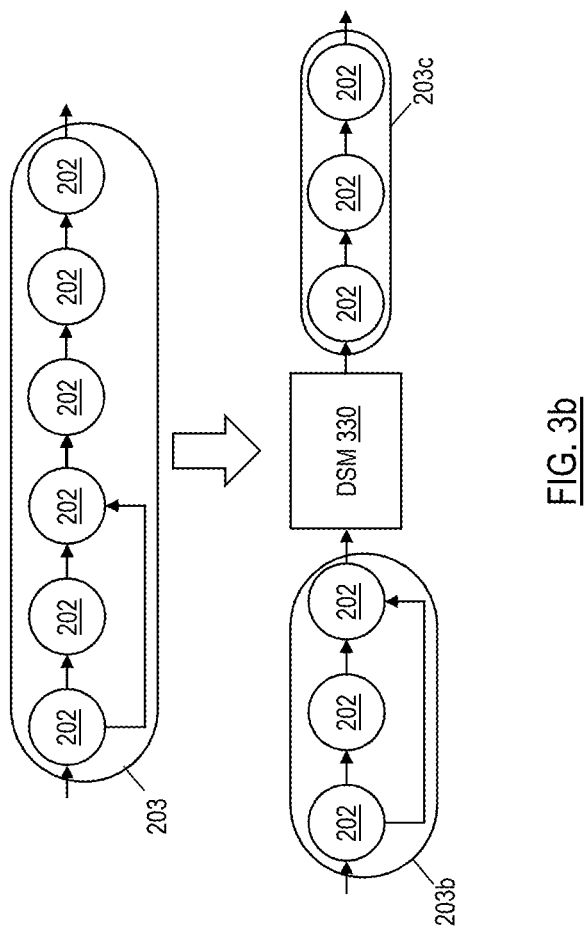
FIG. 3b is a schematic diagram illustrating how the data storage module of FIG. 3a may be incorporated into a NN model.
Figure 3A:
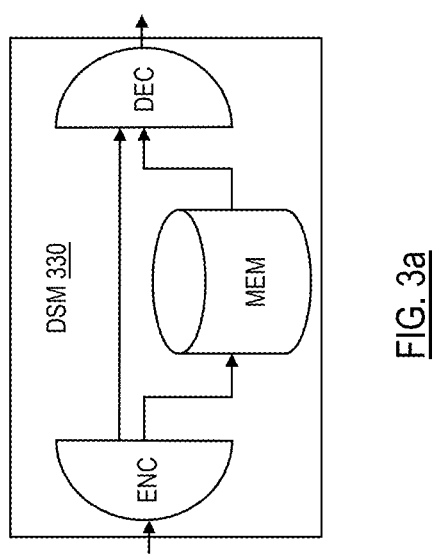
FIG. 3a is a block diagram of a data storage module.

Referring now to FIGS. 3a and 3b, one or more data storage modules (DSM) 330 may be incorporated into the NN model 203. The, or each, DSM 330 is advantageously connected between any two adjacent modules 202. A data memory (MEM) e.g. an HDD, SDD or RAM, is connected to the input of the DSM such that data received at the input of the DSM 330 is stored in the memory. The DSM 330 preferably includes a data path between its input and output to allow data to flow from the input to the output without being stored in the memory. In preferred embodiments, the DSM 330 comprises first and second parallel data paths between its input and its output, the memory (MEM) being provided in one of the paths. Preferably, an encoder ENC is provided to encode data received at the input of the DSM 330, and a corresponding decoder DEC is provided at the output. In preferred embodiments, the encoder ENC receives the input and forwards the corresponding encoded input both to the decoder DEC and to the memory MEM. The decoder DEC can receive an encoded input from the encoder ENC or the memory MEM and provide the corresponding decoded data as output. Optionally, the encoder ENC may be configured to perform data compression, and may use any conventional data compression algorithm for this purpose. Optionally, the decoder DEC may be configured to perform data decompression, and may use any conventional data decompression algorithm for this purpose, typically a decompression algorithm corresponding to the compression algorithm used by the encoder ENC.

FIG. 3b shows an example of how the NN model 203 may be split into first and second sub-models 203b, 203c by insertion of a DSM 330 between two adjacent modules 202. When training data are propagated trough the NN model 203 during the model training process, a snapshot of the output generated by the module 200 immediately before the DSM 330 stored (preferably in encoded form) in the memory MEM of the DSM 330. Subsequently, any relevant component of the apparatus 101 (e.g. the DCU 114, MBU 118 or TSU 122) or an external system may retrieve the stored training data from the DSM memory, without the need to execute the calculations needed to evaluate the part of the model 203 which preceded the DSM 330.

Accordingly, the, or each, DSM 330 splits the model training into two problems:
1. The training of the sub-model 203b comprising the module(s) 202 before the DSM 330;
2. The training of the sub-model 203c comprising the module(s) 202 that follow the DSM 330

In the training of the sub-model 203c, the input used for training may be retrieved from the DSM memory MEM. A characteristic of the data stored in the DSM memory MEM is that they are high level post-processed data from which the original data cannot be retrieved without the knowledge of sub-model 203b.

Optionally, the apparatus 101 may support a configurable data access layer for retrieving and composing data samples for use in training the NN model 203.

Optionally, the apparatus 101 may include a configurable data augmenter configured to produce from any one data sample, multiple slightly distorted versions of it in accordance with a configurable notion of equivalence between the data samples.

As required, the apparatus 101 may include any convenient conventional means for providing secure and reliable communication channels between the components of the apparatus 110, in particular between the NNID 110 and the other components.

It is noted that preferred embodiments of the invention can change the way hardware works any NN inference capable device may be transformed into a device which can train a NN model, as well as improving performance of NN training devices. Also, when the DCU 114 collects statistics as described above, the memory footprint for training a NN model on the apparatus 101 is smaller than the memory footprint required for the same NN model using standard NN training devices. This contributes to the improvement of the memory requirements of such devices and allows multiple trainings on the same device at the same time.

In conventional trained NN model production, the structure of the NN model is fully determined before training, but the final values of its parameters (e.g. input weights) are determined during training. In particular, its layer structure and the way the layers are connected are known. Then the training is performed by pushing the input through the whole network, collecting the output and updating the parameters typically by back-propagation.

In contrast, with preferred embodiments of the invention, the NN model 203 is usually not fully determined before the training takes place. One or more model characteristics, e.g. the number of modules 202, the composition of each module, the connection between modules within the model, and so one, are determined during a combined creation and training process.

Moreover, preferred embodiments do not require dedicated NN training hardware implementing standard training techniques, instead using a device (the NNID) which is able to perform inference of neural networks. Dedicated NNIDs are in general less powerful and more energy efficient than conventional neural network training devices. However, embodiments of the invention may be implemented on conventional NN training devices using only their NNID capabilities. Such embodiments improve the performance of the neural network training device because it is able to train the model by using fewer resources of the device and this allows:

1. multiple models to be trained on the same neural network training device at the same time, and
2. Training one model which cannot fit the device with standard techniques either for its wideness or for its deepness Optionally, the functionality of a neural network training device (if used to implement the NNID 110) may be used to perform refinement of the parameters of the NN model 203 after the creation and training described above. Accordingly, the structure and parameters of the NN model 203 may be determined as described above by apparatus 101, after which the model parameters (in particular the PE input weights and/or bias inputs) may be refined by using standard neural network training techniques, i.e. the model parameters generated during the creation and training process described above may be used as starting point for standard (e.g. gradient based) neural network training techniques.

Trained NN models 203 produced by the apparatus 101 may be deployed in any system comprising an NNI-capable device. As described above, the model 203 may comprise layer(s) that are not possible in standard neural networks (e.g. DB layers). As such, any deployment system may include not only a NNID but also a memory, a database system, a processing unit (e.g. a CPU) and so on. Another possibility is to deploy the apparatus 101 itself.

The invention is not limited to the embodiment(s) described herein but can be amended or modified without departing from the scope of the present invention.

What is claimed is:

1. An apparatus for creating and training an artificial neural network (NN), the apparatus comprising:
   a programmable artificial neural network inference device for implementing and executing NN models;
   at least one memory for storing data records, each data record comprising input data and target output data corresponding to the input data;
   at least one memory for storing a neural network (NN) model for said artificial NN;
   a programmer for programming said artificial neural network inference device to implement said neural network (NN) model;
   said apparatus being configured to:
   program said artificial neural network inference device to implement said neural network (NN) model;
   cause the respective input data from at least some of said data records to be processed by said programmable artificial neural network inference device implementing said NN model to produce output data;
   collect the output data and the corresponding target output data of the respective data record;
   evaluate said output data against the corresponding target output data by consolidating the output data with the corresponding target output data of the respective data record to create a collected data record for each data record;
   create an NN module using at least some of the collected data records;
   add said NN module to the stored NN model to create an updated NN model for said artificial NN; and
   store said updated NN model in said at least one memory for storing an NN model.

2. A method of creating and training an artificial neural network (NN), the method comprising:
   storing data records, each data record comprising input data and target output data corresponding to the input data;
   storing a neural network (NN) model for said artificial NN;
   implementing, by programming a programmable artificial neural network inference device, said neural network (NN) model;
   causing the respective input data from at least some of said data records to be processed by said programmable artificial neural network inference device implementing said NN model to produce output data;
   collecting by a data collector unit the output data and the corresponding target output data of the respective data records;
   evaluating said output data against the corresponding target output data by consolidating the output data with the corresponding target output data of the respective data record to create a collected data record for each data record;
   creating an NN module using at least some of the collected data records;
   adding said NN module to the stored NN model to create an updated NN model for said artificial NN; and
   storing said updated NN model.

3. The method of claim 2, wherein the method further comprises storing the collected data records in the memory.

4. The method of claim 2, wherein said adding involves adding the created NN module to an end of said stored NN model, wherein said end is an output end of said stored NN model.

5. The method of claim 2, wherein the NN module comprises at least one NN layer, and wherein said at least one NN layer comprises at least one NN processing element (PE).

6. The method of claim 5, wherein said at least one NN layer comprises a functional entity.

7. The method of claim 5, wherein said NN model comprises a plurality of NN modules connected in series from a first NN module to a last NN module, wherein said adding involves adding said created NN module to said NN model as said last NN module.

8. The method of claim 5, including adding at least one data storage module into the NN model between any two adjacent NN modules, said data storage module comprising a memory for storing data received by the data storage module.

9. The method of claim 8, wherein the data storage module includes a data path between its input and output to allow data to flow from the input to the output without being stored in the memory.

10. The method of claim 8, wherein the memory is provided in a data path between the input and the output of the data storage module.

11. The method of claim 8, including providing an encoder to encode data received at the input of the data storage module, and a corresponding decoder at the output of the data storage module.

12. The method of claim 2, including performing at least one iteration comprising:
   programming said programmable artificial neural network inference device to implement said updated NN model; causing the respective input data from at least some of said data records to be processed by said programmable artificial neural network inference device implementing said updated NN model to produce new output data; evaluating said new output data against corresponding target output data by consolidating the new output data with the corresponding target output data of the respective data record to create a collected data record for each data record; creating another NN module using at least some of the collected data records; adding said another NN module to said updated NN model to create a further updated NN model for said artificial NN; and storing said further updated NN model, and wherein said at least one iteration is performed until said evaluating indicates that said output data meets at least one performance criterion.

13. The method of claim 2, wherein said evaluating involves determining whether or not said output data meets at least one criterion with respect to said target output data, and wherein said at least one criterion may comprise a measure of closeness between said output data and said target output data.

14. The method of claim 2, wherein said creating said NN module involves determining at least one data processing function that, when applied to said output data, improves the output data by causing the processed output data to be closer to the corresponding target output data than non-processed output data, and creating said NN module to implement said at least one determined data processing function.

15. The method of claim 2, wherein said creating said NN module involves determining an NN structure for the NN module, wherein determining said NN structure involves determining any one or more of: a required number of NN layers of the NN structure; a composition of the or each NN layer; and interconnections of the NN layers.

16. The method of claim 15, wherein determining said NN structure involves determining one or more values for one or more parameters of said NN structure, wherein said parameters may include at least one weight and/or at least one bias, wherein the or each weight may be a weight applied to a respective input of a respective processing element (PE) of said NN structure, and wherein said bias may be a respective input of a respective processing element (PE) of said NN structure.

* * * * *